US012561160B2

(12) United States Patent
Cui et al.

(10) Patent No.: US 12,561,160 B2
(45) Date of Patent: Feb. 24, 2026

(54) USING OSTree NATIVE CONTAINERS TO CUSTOMIZE VIRTUAL MACHINES FOR LIGHTWEIGHT APPLICATION DEPLOYMENT

(71) Applicant: Red Hat, Inc., Raleigh, NC (US)

(72) Inventors: Ashley Cui, New York, NY (US); Leigh Griffin, Waterford (IE); Stephen B. Milner, Tallahassee, FL (US); Colin G. Walters, Sudbury, MA (US); Brent J. Baude, Harris, MN (US)

(73) Assignee: Red Hat, Inc., Raleigh, NC (US)

( * ) Notice: Subject to any disclaimer, the term of this patent is extended or adjusted under 35 U.S.C. 154(b) by 461 days.

(21) Appl. No.: 18/128,939

(22) Filed: Mar. 30, 2023

(65) Prior Publication Data

US 2024/0330030 A1      Oct. 3, 2024

(51) Int. Cl.
*G06F 9/455*          (2018.01)
*G06F 8/65*           (2018.01)
(52) U.S. Cl.
CPC ............ *G06F 9/45558* (2013.01); *G06F 8/65* (2013.01); *G06F 2009/4557* (2013.01); *G06F 2009/45595* (2013.01)
(58) Field of Classification Search
CPC .................. G06F 9/45558; G06F 8/65; G06F 2009/4557; G06F 2009/45595
See application file for complete search history.

(56) References Cited

U.S. PATENT DOCUMENTS

| | | | | |
|---|---|---|---|---|
| 2018/0316747 A1* | 11/2018 | Scrivano | ............... | H04L 63/083 |
| 2019/0251190 A1* | 8/2019 | Scrivano | ............... | G06F 16/162 |
| 2020/0034167 A1* | 1/2020 | Parthasarathy | ...... | G06F 9/45558 |
| 2020/0348959 A1* | 11/2020 | Krasner | ............... | G06F 9/5027 |

OTHER PUBLICATIONS ("Atomic Upgrades," available at https://web.archive.org/web/20211201032219/https://ostreedev.github.io/ostree/atomic-upgrades/, Red Hat, Inc., published Dec. 1, 2021) (Year: 2021) (Year: 2021).*
("ostree native containers," available at https://web.archive.org/web/20220126172807/https://coreos.github.io/rpm-ostree/container/, Red Hat, Inc., published Jan. 26, 2022) (Year: 2022) (Year: 2022).*
Deneve, Mark. "Using Podman on Mac OSX." Mar. 15, 2022. Random Tech Adventures.
"Changes/OstreeNativeContainerStable." Dec. 6, 2022. Fedora Project Wiki.

* cited by examiner

*Primary Examiner* — Jacob D Dascomb
(74) *Attorney, Agent, or Firm* — Womble Bond Dickinson (US) LLP

(57) ABSTRACT
A system and method of customizing virtual machines for lightweight application deployment. The method includes executing a first operating system (OS) within a virtual machine (VM) environment and a second OS outside of the VM environment. The method includes receiving, by a server application executing on the first OS, a request to perform a task for a client application executing on the second OS. The method includes detecting, by the server application based on the request, an incompatibility between the server application and the client application. The method includes resolving, by a processing device, the incompatibility using a plurality of container images.

18 Claims, 6 Drawing Sheets

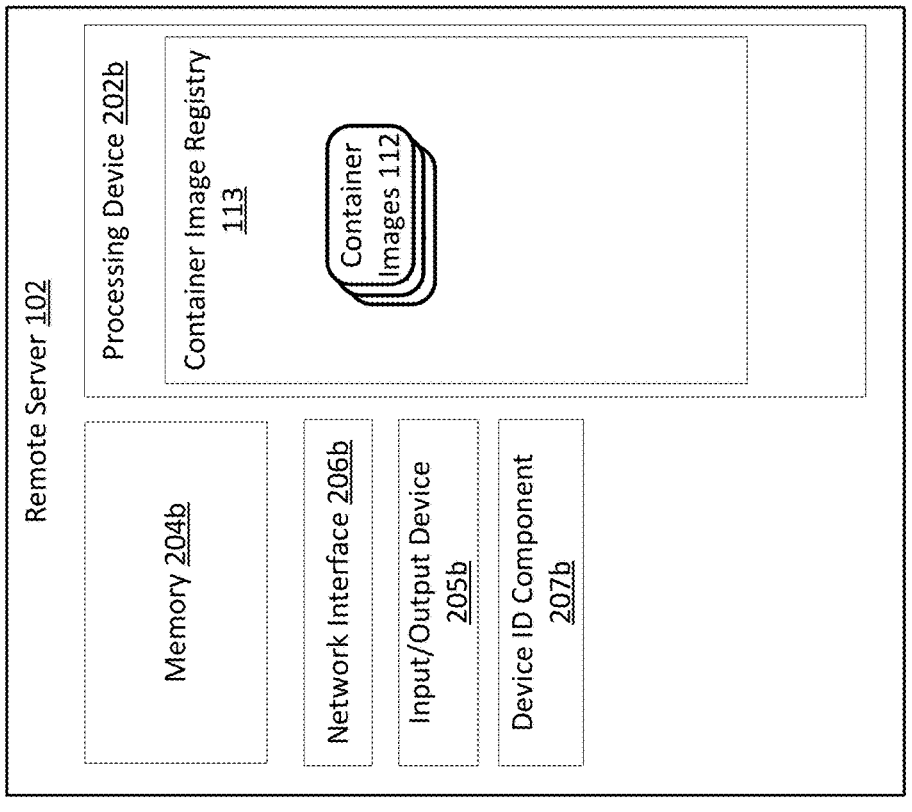

Remote Server 102

Processing Device 202b

Container Image Registry 113

Container Images 112

Memory 204b

Network Interface 206b

Input/Output Device 205b

Device ID Component 207b

FIG. 2B

Virtual Machine Management (VMM) System 104

Processing Device 202a

Virtual Machine 108

Operating System 109

Server Application 110

OSTree native container 111

Operating System 105

Hypervisor Application 106

Client Application 107

Memory 204a

Network Interface 206a

Input/Output Device 205a

Device ID Component 207a

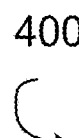

executing a first operating system (OS) within a virtual machine (VM) environment and a second OS outside of the VM environment
402 receiving, by a server application executing on the first OS, a request to perform a task for a client application executing on the second OS
404 detecting, by the server application based on the request, an incompatibility between the server application and the client application
406 resolving, by a processing device, the incompatibility using a plurality of container images
408

FIG. 4

USING OSTree NATIVE CONTAINERS TO CUSTOMIZE VIRTUAL MACHINES FOR LIGHTWEIGHT APPLICATION DEPLOYMENT

TECHNICAL FIELD

The present disclosure relates generally to virtual machines, and more particularly, to systems and methods of customizing virtual machines for lightweight application deployment.

BACKGROUND

Containerization is the packaging together of software code with all it's necessary components like libraries, frameworks, and other dependencies so that they are isolated in their own container. This is so that the software or application within the container can be moved and run consistently in any environment and on any infrastructure, independent of that environment or infrastructure's operating system. The container acts as a kind of bubble or a computing environment surrounding the application and keeping it independent of its surroundings. It is basically a fully functional and portable computing environment.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2A is a block diagram depicting an example of the VMM system 104 in FIG. 1, according to some embodiments;

FIG. 2B is a block diagram depicting an example of the remote server 102 of the environment in FIG. 1, according to some embodiments;

FIG. 3 is a block diagram depicting pseudo examples of how a user could interact with the server application using an input terminal, according to some embodiments;

FIG. 4 is a flow diagram depicting a method of customizing virtual machines for lightweight application deployment, according to some embodiments.

DETAILED DESCRIPTION

Figure 1:
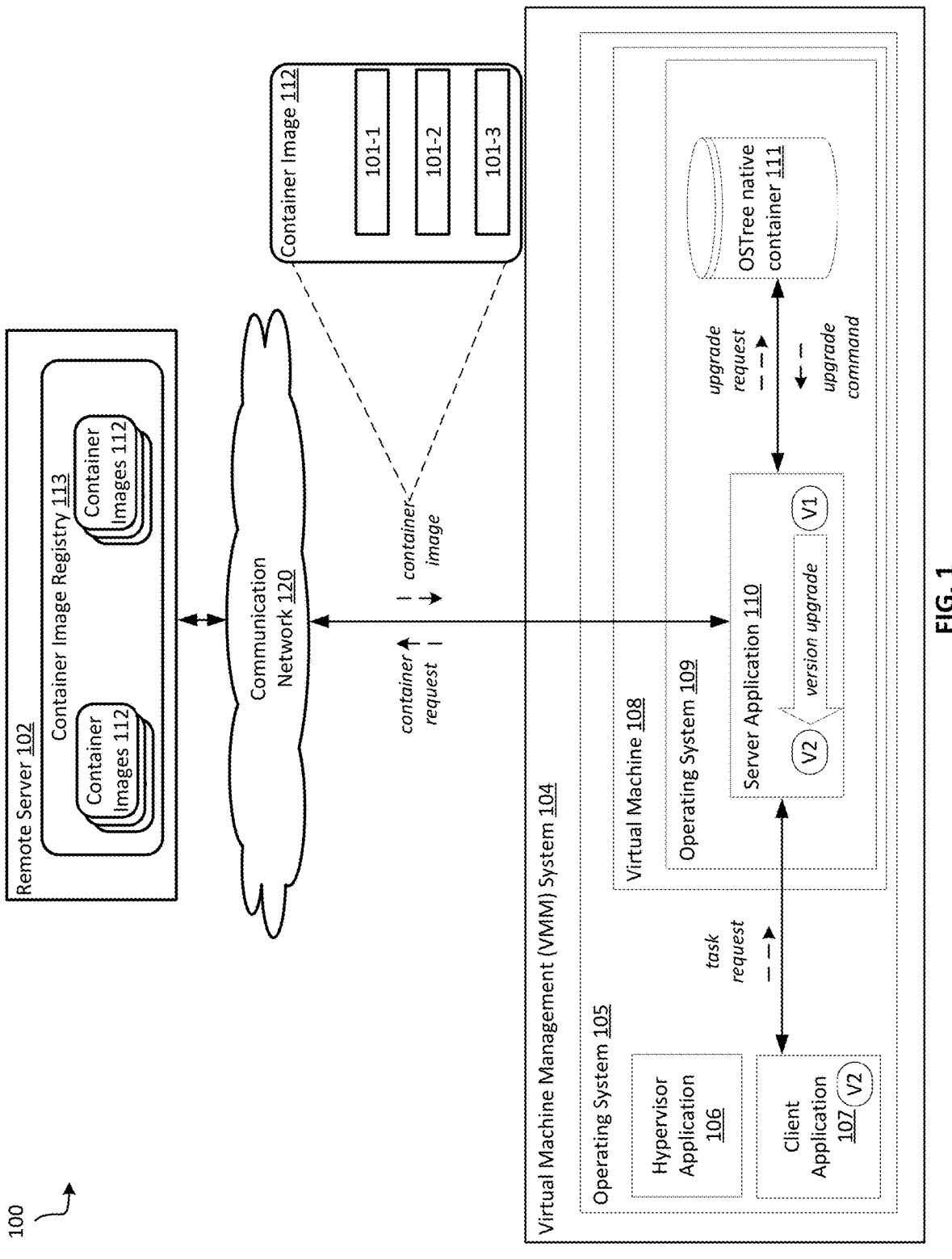
FIG. 1 is a block diagram depicting an example environment for customizing virtual machines for lightweight application deployment, according to some embodiments.

A single copy of a containerized software application is designed to execute on a particular operating system (OS) (e.g., Linux), but not on multiple operating systems. For example, an application that is designed for Linux OS cannot execute on the Windows OS. A conventional technique to circumvent this restriction is to launch a virtual machine (VM) from the Windows OS, run the Linux OS within the virtual environment of the VM, and then execute the application within the Linux OS. Although this is a viable option, it does present several challenges.

For one, a VM is a "general use" VM image that is not tailored for the application or a user's specific uses for the application. For example, the general use VM does not allocate the precise arrangement of resources (e.g., memory, processing, storage, libraries, etc.) for the application to efficiently run on the VM. These general use VMs are also difficult to build and maintain, which forces the user to have to wait for the VM provider and/or application provider to release any upgrades. This could expose the computing environment to malicious attacks that exploit the vulnerabilities of the outdated VM environment and/or application. These VMs also suffer from bloat, which is when successive versions of a computer program become perceptibly slower, use more memory, disk space or processing power, or have higher hardware requirements than the previous version, while making only dubious user-perceptible improvements or suffering from feature creep. This software bloat can make edge deployments a challenge. The VMs are also difficult to customize outside of small changes done with ignition, which further makes upgrades of the application difficult. For example, the VM are destroyed and re-created before upgrading the application that executes inside the VM because the version of application is immutable. Thus, there is a long-felt but unsolved need to solve the problems of allowing a user to easily maintain and upgrade a VM without interrupting the application and/or containers that execute within the VM environment.

Aspects of the present disclosure address the above-noted and other deficiencies by customizing virtual machines for lightweight application deployment. Benefits of the embodiments of the present disclosure include an ability to promptly detect when to upgrade a VM environment and/or applications executing within the VM environment and promptly apply the upgrade to close the vulnerabilities before they can be exploited by a malicious attacker. As such, the embodiments of the present disclosure provide a layer of protection against application data theft and protection against wastage of computing resources (e.g., memory resources, power resources, processing resources, networking resources) of a computing environment that would have occurred if an attacker exploited the now-closed, vulnerability.

As discussed in greater detail below, the embodiments of the present disclosure provide a mechanism that leverages the OSTree native container concept to build tailored VMs for applications and/or containers that are executing in the VM environment. Although, building VM images can be a tedious process involving dedicated systems, building container files (e.g., Containerfile) in generic command line (CL) systems are much more accessible. For this reason, the present embodiments allow VM modifications (e.g., upgrades or downgrades) to be built using these container files, which allows a host machine (e.g., a virtual machine management system) to build VM's more frequently and more tailored for each application (or container) requirement. The host machine can build each VM with a specific application version and specific versions of its dependencies. The host machine can tailor the VM according to specific architectures, operating systems, and/or virtual machine environments. These bootable container images may be configured to exclude (if indicated by the application requirements) any unnecessary packages which are included in the general use VM; thereby reducing bloat and allowing for more resource-constrained deployments. After the host machine builds a container image, it can then push the container images to a container image registry (e.g., a regular container image) for other host machines to retrieve and use for their purposes. These container images images can be persistent inside the container image registry.

In one embodiment, an application that executes on a host machine can automatically detect the OS, architecture, and version of an application that is to be installed. The application can send a request to a container image registry to retrieve any custom tailored VM for that instance. The VM will have been custom built, which means it includes every package that the application needs to run smoothly and will exclude any packages (e.g., the bloat) that the application does not need. If such a VM does not exist in the container image registry, then the host machine may decompose the request from a metadata perspective. That is, the host machine may create (based on the decomposed request) a customized container file that can pass through a dedicated build system to receive the appropriate decoration and result in a valid, compilable and executable VM tailored to the exact needs of the request. The host machine can store the customized container in the container image registry.

The customized VM are much smaller than the general use VM, meaning that it runs faster, and takes up less space on the host machine. On new releases of an application, the application will be updated and attempt to establish a connection with the outdated VM. The application will discover that there is a version mismatch. In the conventional system, the application will error out, requiring a new pull of a general purpose VM, which will destroy all existing containers and cause downtime. However, in some embodiments of the present disclosure, the application is configured to query the registry and pull down the specific image layers to upgrade the application and build the specific image layers on top of the existing base image layer, as opposed to building an entire new VM image. Consequently, the containers are allowed to persist across version upgrades because the VM storage may remain the same. Furthermore, pulling only the new image layers (e.g., the differences) from the network instead of all the layers will also reduce network congestion and improve network bandwidth.

In an illustrative embodiment, a virtual machine management (VMM) system (e.g., a host machine) executes a first OS (e.g., Linux) within a virtual machine (VM) environment and a second OS (e.g., Windows, macOS, etc.) outside of the VM environment. A server application (e.g., Podman) executing on the first OS receives a request to perform a task for a client application (e.g., Podman) executing on the second OS. The server application detects, based on the request, an incompatibility (e.g., software version) between the server application and the client application. The server application resolves the incompatibility using a plurality of container images, wherein at least one of the container images may be ostree native container image.

FIG. 1 is a block diagram depicting an example environment for customizing virtual machines for lightweight application deployment, according to some embodiments. The environment 100 includes a virtual machine management (VMM) system 104 (e.g., host machine) and a remote server 102 that are communicably coupled together via a communication network 120. The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g., cell towers), etc. The communication network 120 may carry communications (e.g., data, message, packets, frames, etc.) between any other the computing device.

The remote server 102 is configured to build a container image registry 113 based on one or more application files (e.g., source code, executable code, libraries, dependencies, configuration files, etc.) and execute the container image registry 113 on its processor. The container image registry 113 is a container image that is configured to store one or more unique container images 112. A container image 112 includes one or more unique image layers 101 that are stacked on top of one another, where the bottom layer is referred to as the parent layer or the base layer. As shown in FIG. 1, an example container image 112 may include an image layer 101-1, an image layer 101-2, and an image layer 101-3 (collectively referred to as, "image layers 101"). However, a container image 112 may include any number of image layers 101.

In some embodiments, one or more developers may create an image layer 101 using a computing device (e.g., VMM system 104) and upload (e.g., store) the image layer 101 to the remote server 102 via the communication network 120 to be stored in the container image registry 113. Similarly, one or more developers may create, using a computer device, a container image 112 that includes one or more image layers 101 and upload the container image 112 to the remote server 122 via the communication network 120 to be stored in the container image registry 113. A computing device may compile the container image 112 from one or more file system layers that are built onto a parent image or base image. For example, the container image registry 113 may include a first container image 112 (e.g., referred to as, container image 112a) that includes two image layers 101, a second container image 112 (e.g., referred to as, container image 112b) that includes three image layers 101, a third container image 112 (e.g., referred to as, container image 112c) that includes one image layer 101, and so on. Thus, the remote server 102 may store in its container image registry 113 one or more image layers 101 that are standalone from a container image 112 and/or one or more container images 112, where each container image 112 includes one or more image layers 101.

A container image 112 is a standard unit of software that packages up code and one or more (e.g., or all) of its dependencies so that a software application may run efficiently and reliably from one computing environment to another. That is, a container image 112 is a lightweight, standalone, executable package of software that includes everything (e.g., code, runtime, dependencies, system tools, configuration files, system libraries and settings, etc.) needed to run an application. The container image 112 is an unchangeable, static file that includes executable code that allows the container image 112 to run as an isolated process. Specifically, each container image 112 is allocated a set of resources (e.g., memory, processing, storage, and/or network bandwidth, etc.) that are isolated from the resources that are allocated to other container images 112 executing on the same computing device, but the container images 112 are still allowed to communicate with each other through communication channels.

A layer 101 may include application code, libraries, system tools, dependencies, configuration/setting files, environment variables, runtimes, and other files and/or binary files needed to make an application execute. A layer 101 may be configured to provide a service. Non-limiting examples of a service include a database or repository service, a compute service, a file system service, a cloud storage service, an application service, a network service, a network traffic management service, a cybersecurity service, etc.

A container image 112 that includes multiple layers 101 may provide a variety of different types of services according to the layers 101, wherein each layer uses (e.g., allocates, reserves) a particular set of computing resources and a particular amount of each computing resource (e.g., memory, processing, storage, and/or network bandwidth, etc.) of the computing environment that executes the container image 112. For example, a first layer (e.g., layer 101-1) of container image 112 may correspond to one or more binary files that use 1 gigabyte (GB) of data storage and 100 megabytes (MB) of memory of the computing environment (e.g., a VMM system 104), and a second layer (e.g., layer 101-2) of the container image 112 may correspond to one or more binary files that use 0.5 gigabyte (GB) of data storage and 50 megabytes (MB) of memory of the computing environment, and a third layer (e.g., layer 101-3) of container image 112 may correspond to one or more binary files that use 200 megabytes (MB) of memory and no amount of data storage of the computing environment.

The VMM system 104 executes an operating system 105 (e.g., Windows OS, macOS, etc.). The VMM system 104 executes a hypervisor application 106 (e.g., VirtualBox, QEMU, HyperV, Windows Subsystem for Linux (WSL)) in the user space of the operating system 105, where the hypervisor application 106 is configured to build and launch one or more virtual machines (VM) 108 that execute on the operating system 105. Each VM 108 provides an isolated environment (virtual environment) for executing an operating system 109 (e.g., Linux). The operating system 109 is configured to execute one or more server applications 110 that are each associated with a particular version. For example, the server application may be version 1 (V1), version 2 (V2), version 3 (V3), and so on.

A virtual environment is a virtual machine (VM) that executes on a hypervisor which executes on top of an operating system (e.g., operating system 105) of the VMM system 104. The hypervisor manages system sources (including access to hardware devices, such as processing devices, memories, storage devices, etc.). The hypervisor may also emulate the hardware (or other physical resources) which may be used by the VMs to execute software/applications. In another embodiment, a virtual environment may be a container that may execute on a container engine (e.g., hypervisor application 106, client application 107) which executes on top of the operating system 105 of the VMM system 104. For example, a container engine may allow different containers to share the operating system of a computing device (e.g., the OS kernel, binaries, libraries, etc.).

Each server application 110 (e.g., Podman) is configured to allow a user of the VMM system 104 to use an operating system-level virtualization to package software (including its corresponding dependencies) into a container image (e.g., container image 112) and to execute the container image 112. For example, the server application 110 may be configured to generate a container image 112 using one or more files of a software application project. The server application 110 is configured with server-based functionality and configured to interoperate with a client application (e.g., client application 107).

The operating system 105 executes the client application 107 (e.g., Podman) in the user space of the operating system 105, but outside of the virtual environment provided by the VM 108. The client application 107 is configured with client-based functionality and configured to interoperate with the server application 110. The client application 107 may send a request (shown in FIG. 1 as, task request) to the server application 110 to perform a task for the client application 107. The request may be, for example, a request to execute an application or a container image on the operating system 109, which causes the server application 110 to perform the request.

The server application 110 may be configured to generate one or more container images 112 from one or more images, test documents, container files (e.g., Containerfile), and/or image layers that are associated with the images. In some embodiment, the server application 110 may be configured to make changes (e.g., writing new files/data, modifying existing files/data, deleting files, etc.) to a running container image (e.g., container image 112) by writing to the writable container layer. In some embodiments, the server application 110 may be configured to generate the container image 112 by adding a writable layer (sometimes referred to as, "container layer") on top of the underlying layers of a container image 112 to rebase the container image 112. For example, the server application 110 may retrieve a container image 112 and one or more image layers 101 from the container image registry 113 and add the one or more image layers on top of the layers of the container image 112. In some embodiments, the server application 110 may be configured to delete the container image 112 by deleting the writable layer, but where the underlying image remains unchanged.

The operating system 109 is configured to execute an OSTree native container image 111. The OSTree native container 111 is a container image in a specific structure that is understood by OSTree, which is an upgrade system for Linux-based operating systems (e.g., operating system 109) that performs atomic upgrades of complete filesystem trees. The OSTree native container 111 is configured to receive a container image (e.g., container image 112) from the server application 110 and apply the container image 112 via rpm-ostree/ostree application (e.g., an application that manages packages on a VM) on the VMM system 104 to update the server application 110, the operating system 109, and/or the virtual machine 108.

The server application 110 may use the OSTree native container 111 to resolve a mismatch between a version of the client application 107 and the server application 110, the operating system 109, and/or the virtual machine 108. The server application 110 may send a request (shown in FIG. 1 as, upgrade request) that includes a first type of container 112 to the OSTree native container 111 to upgrade the server application 110. The upgrade request causes the OSTree native container 111 to apply (shown in FIG. 1 as, upgrade command) the container image 112 to the server application 110 to update the server application 110 from a current version (e.g., V1) to a different version (e.g., V2) based on the information (e.g., code, runtime, dependencies, system tools, configuration files, system libraries and settings, etc.) included in the container image 112 to resolve the mismatch between the version of the client application 107 (e.g., V2) and the version of the server application 110. As another example, the server application 110 may send an upgrade request that includes a second type of container 112 to the OSTree native container 111, which in turn, applies the container image 112 to the operating system 109 to update the operating system 109 from a current version (e.g., V1) to a different version (e.g., V2, V3, V4, etc.) based on the information included in the container image 112 to resolve the mismatch between the version of the client application 107 and the version of the operating system 109. As another example, the server application 110 may send an upgrade request that includes a third type of container 112 to the OSTree native container 111, which in turn, applies the container image 112 to the virtual machine 108 to update the virtual machine 108 from a current version (e.g., V1) to a different version (e.g., V2, V3, V4, etc.) based on the information included in the container image 112 to resolve the mismatch between the version of the client application 107 and the version of the virtual machine 108. The first type of container image 112, the second of container image 112, and the third type of container image are each different types of container images 112. The server application 110 generated each type of container image 112 based on whether the server application 110 intends to update itself, the operating system 109, and/or the virtual machine 108.

In some embodiments, the server application 110 resolves a mismatch between a version of the client application 107 and the other software application (e.g., server application 110, the operating system 109, and/or the virtual machine 108) by upgrading or downgrading the other software application to the same version as the client application 107. For example, the server application 110 may determine that the client application 107 is version 2 (V2) and that the other software application is not version 2 and therefore not compatible with the client application 107, and in response, generate the container image 112 to include the information to upgrade the other software application to version 2. As another example, the server application 110 may determine that the client application 107 is version 2 (V2) and that the other software application is not version 2 and therefore not compatible with the client application 107, and in response, generate the container image 112 to include the information to downgrade the other software application from version 3 to version 2.

In some embodiments, the server application 110 resolves a mismatch between a version of the client application 107 and the other software application (e.g., server application 110, the operating system 109, and/or the virtual machine 108) by upgrading the other software application to a different version as the client application 107. For example, the server application 110 may determine that the client application 107 is version 2 (V2) and that the other software application is a version that is not compatible with version 2 of the client application 107, and in response, generate the container image 112 to include the information to upgrade the other software application to version 3. As another example, the server application 110 may determine that the client application 107 is version 2 (V2) and that the other software application is a version that is not compatible with version 2 of the client application 107, and in response, generate the container image 112 to include the information to downgrade the other software application from version 3 to version 2.

In some embodiments, the client application 107 (instead of the server application 110) may use the OSTree native container 111 to resolve a mismatch between a version of the client application 107 and the other software application (e.g., server application 110, the operating system 109, and/or the virtual machine 108). For example, the client application 110 may send a request (e.g., upgrade request, downgrade request) that includes a first type of container 112 to the OSTree native container 111 to upgrade the server application 110, which causes the OSTree native container 111 to apply the container image 112 to the server application 110, the operating system 109, or the virtual machine 108 to upgrade or downgrade the other software application (e.g., server application 110, the operating system 109, and/or the virtual machine 108).

The VMM system 104 and remote server 102 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

Still referring to FIG. 1, the VMM system 104 executes the OS 109 (e.g., Linux) within the VM environment provided by the VM 108 and the 105 (e.g., Windows, macOS, etc.) outside of the VM environment. The server application 110 (e.g., Podman) that executes on the OS 109 receives a request to perform a task for the client application 107 (e.g., Podman) that executes on the OS 105. The server application 110 detects, based on the request, an incompatibility (e.g., software version) between the server application 110 and the client application 107. The server application 110 resolves the incompatibility using the container image 112 and the OSTree native container image 111.

Although FIG. 1 shows only a select number of computing devices (e.g., VMM system 104 and remote server 102); the environment 100 may include any number of cloud service systems and computing devices that are interconnected in any arrangement to facilitate the exchange of data between the computing devices.

FIG. 2A is a block diagram depicting an example of the VMM system 104 in FIG. 1, according to some embodiments. While various devices, interfaces, and logic with particular functionality are shown, it should be understood that the VMM system 104 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The VMM system 104 includes a processing device 202a (e.g., general purpose processor, a PLD, etc.), which may be composed of one or more processors, and a memory 204a (e.g., synchronous dynamic random-access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the VMM system 104. In some embodiments, the processing device 202a and the memory 204a form various processing devices and/or circuits described with respect to the VMM system 104. The instructions include code from any suitable computer programming language such as, but not limited to, C, C++, C #, Java, JavaScript, VBScript, Perl, HTML, XML, Python, TCL, and Basic.

The processing device 202a may be configured to execute the operating system 105 (e.g., Windows OS, macOS, etc.), which executes the hypervisor application 106 (e.g., VirtualBox) and the client application 107. The hypervisor application 106 is configured to build and launch one or more virtual machines (VM) 108 that execute on the operating system 105. Each VM 108 provides an isolated environment (virtual environment) for executing the operating system 109 (e.g., Linux). The operating system 109 is configured to execute one or more server applications 110 that are each associated with a particular version. The processing device 202a executes the OSTree native container 111 on the the operating system 109.

The server application 110 may be configured to receive a request (shown in FIG. 1 as, task request) to perform a task for the client application 107. In some embodiments, the task to perform is for the server application 110 to execute one or more container images and/or one or more applications. In some embodiments, the request may indicate a current version of the client application 107, a particular version (or range of versions) of the server application 110 that are compatible with the current version of the client application 107, a particular version (or range of versions) of the operating system 109 (e.g., Linux) that is compatible with the current version of the client application 107, a particular version (or range of versions) of the VM environment that are compatible with the current version of the client application 107, and/or an architecture (HW) (arrangement, versions, etc.) of the VMM system 104 that is compatible with the current version of the client application 107.

The server application 110 may be configured to detect (e.g., determine, sense), based on the request, an incompatibility between the server application 110 and the client application 107. The server application 110 is configured to resolve the incompatibility using a plurality of container images (e.g., one or more container images 112, OStree native container image 111).

The server application 110 may be configured to detect, based on the request, the incompatibility between the server application 110 and the client application 107 by determining a version mismatch between the client application 107 and the server application 110, determining a version mismatch between the client application 107 and the VM environment (e.g., VM 108), determining a version mismatch between the client application 107 and the operating system 109, determining a version mismatch between the server application 110 and the VM environment (e.g., VM 108), and/or determining a version mismatch between the server application 110 and the operating system 109.

The server application 110 may be configured to resolve the incompatibility using the plurality of container images by sending a first container image (e.g., container image 112) of the plurality of container images to a second container image (e.g., OSTree native container 111) of the plurality of container images to cause the second container image to update, using the first container image, at least one of the server application 110, the operating system 109, and/or the VM environment (e.g., VM 108).

The server application 110 may be configured to resolve the incompatibility without creating an event that interrupts a performance of other container images and/or applications that are currently executing within the VM environment. Example events include events that pause, stop/terminate, glitch, tear-down, or slow-down a performance of a container image and/or application.

The server application 110 may be configured to identify a first container image of the plurality of container images based on the incompatibility between the server application 110 and the client application 107; and determine whether the first container image is available in the container image registry 113. For example, the server application 110 may send a request (shown in FIG. 1 as, container request) to the remote server 102 for container image 112 to cause the remote server 102 to check whether the container image registry 113 includes the container image 112. If the container image registry 113 includes the container image 112, then the remote server 102 sends the container image to the server application 110.

If the container image registry 113 does not include the container image 112, the remote server 102 sends a message to the server application 110 that indicates that the container image registry 113 does not include the container image 112. Upon receiving the message, the server application 110 may determine one or more differences (e.g., version differences, etc.) associated with the incompatibility between the server application 110 and the client application 107 and generate the container image 112 based on the one or more differences.

The server application 110 may be configured to generate the first container image based on the one or more differences by identifying, based on the one or more differences, one or more container image layers; acquiring (e.g., retrieving) the one or more container image layers from the container image registry 113; and rebasing, using the one or more container image layers, a base layer associated with the server application 110 to generate the first container image.

The server application 110 may be configured to store the first container image in the container image registry 113 to be used by used by other server applications 110. In some embodiments, the first OS (e.g., operating system 109) is a Linux OS and the second OS (e.g., operating system 105) is a different type of operating system than the first OS.

The VMM system 104 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the VMM system 104 includes a plurality of network interfaces 206a of different types, allowing for connections to a variety of networks, such as local area networks (public or private) or wide area networks including the Internet, via different sub-networks.

The VMM system 104 includes an input/output device 205a configured to receive user input from and provide information to a user. In this regard, the input/output device 205a is structured to exchange data, communications, instructions, etc. with an input/output component of the VMM system 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the VMM system 104, such as a built-in display, touch screen, microphone, etc., or external to the housing of VMM system 104, such as a monitor connected to VMM system 104, a speaker connected to VMM system 104, etc., according to various embodiments. In some embodiments, the VMM system 104 includes communication circuitry for facilitating the exchange of data, values, messages, and the like between the input/output device 205a and the components of the VMM system 104. In some embodiments, the input/output device 205a includes machine-readable media for facilitating the exchange of information between the input/output device 205a and the components of the VMM system 104. In still another embodiment, the input/output device 205a includes any combination of hardware components (e.g., a touchscreen), communication circuitry, and machine-readable media.

The VMM system 104 includes a device identification component 207a (shown in FIG. 2A as device ID component 207a) configured to generate and/or manage a device identifier associated with the VMM system 104. The device identifier may include any type and form of identification used to distinguish the VMM system 104 from other computing devices. In some embodiments, to preserve privacy, the device identifier may be cryptographically generated, encrypted, or otherwise obfuscated by any device and/or component of VMM system 104. In some embodiments, the VMM system 104 may include the device identifier in any communication (e.g., messages for mutual attestation, etc.) that the VMM system 104 sends to a computing device.

The VMM system 104 includes a bus (not shown), such as an address/data bus or other communication mechanism for communicating information, which interconnects the devices and/or components of VMM system 104, such as processing device 202a, network interface 206a, input/output device 205a, and device ID component 207a.

In some embodiments, some or all of the devices and/or components of VMM system 104 may be implemented with the processing device 202a. For example, the VMM system 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the remote server 102 of the environment in FIG. 1, according to some embodiments. While various devices, interfaces, and logic with particular functionality are shown, it should be understood that the remote server 102 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The remote server 102 includes a processing device 202b (e.g., general purpose processor, a PLD, etc.), which may be composed of one or more processors, and a memory 204b (e.g., synchronous dynamic random-access memory (DRAM), read-only memory (ROM)), which may communicate with each other via a bus (not shown). The processing device 202b includes identical or nearly identical functionality as processing device 202a in FIG. 2a, but with respect to devices and/or components of the remote server 102 instead of devices and/or components of the VMM system 104.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the remote server 102 instead of devices and/or components of the VMM system 104.

The processing device 202b may be configured to execute a container image registry 113. The container image registry 113 is a container image that is configured to store one or more unique image layers 101 and one or more unique container images 112. The container image registry 113 may be configured to receive a request (e.g., container request) from the server application 110 for a particular container image (e.g., container image 112). In response, the container image registry 113 checks whether it currently stores the container image 112. If the container image registry 113 includes the container image 112, then the container image registry 113 sends the container image 112 to the server application 110. If the container image registry 113 does not include the container image 112, the container image registry 113 sends a message to the server application 110 that indicates that the container image registry 113 does not include the container image 112.

The remote server 102 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the remote server 102 instead of devices and/or components of the VMM system 104.

The remote server 102 includes an input/output device 205b configured to receive user input from and provide information to a user. In this regard, the input/output device 205b is structured to exchange data, communications, instructions, etc. with an input/output component of the remote server 102. The input/output device 205b includes identical or nearly identical functionality as input/output device 205a in FIG. 2A, but with respect to devices and/or components of the remote server 102 instead of devices and/or components of the VMM system 104.

The remote server 102 includes a device identification component 207b (shown in FIG. 2B as device ID component 207b) configured to generate and/or manage a device identifier associated with the remote server 102. The device ID component 207b includes identical or nearly identical functionality as device ID component 207a in FIG. 2A, but with respect to devices and/or components of the remote server 102 instead of devices and/or components of the VMM system 104.

The remote server 102 includes a bus (not shown), such as an address/data bus or other communication mechanism for communicating information, which interconnects the devices and/or components of the remote server 102, such as processing device 202b, network interface 206b, input/output device 205b, and device ID component 207b.

In some embodiments, some or all of the devices and/or components of remote server 102 may be implemented with the processing device 202b. For example, the remote server 102 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

Figure 2C:
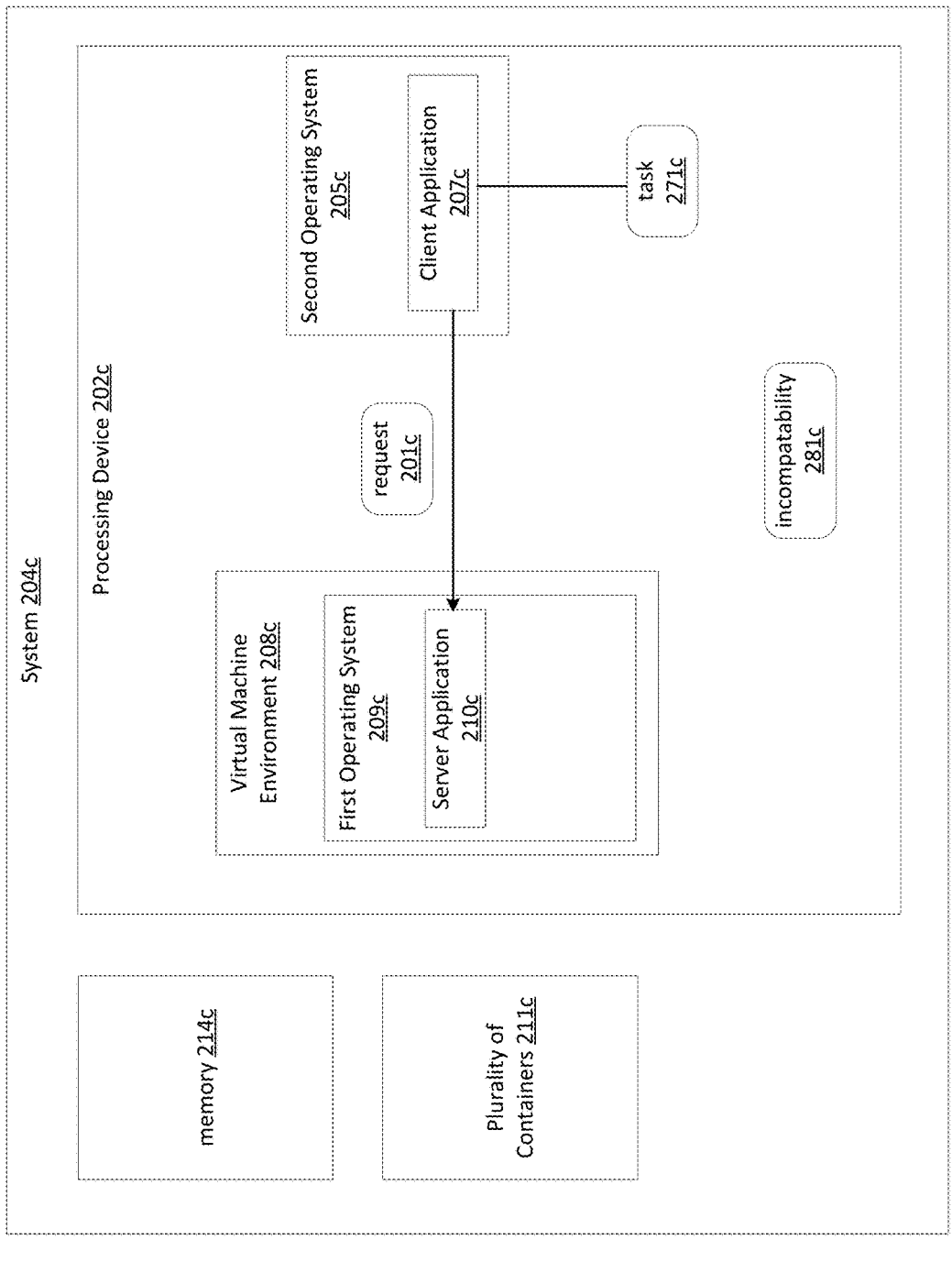
FIG. 2C is a block diagram depicting an example environment for using an VMM system, according to some embodiments.

FIG. 2C is a block diagram depicting an example environment for using an VMM system, according to some embodiments. The VMM system 204c (e.g., VMM system 104 in FIG. 1) includes a memory 214c; and a processing device 202c that is operatively coupled to the memory, to execute a first operating system 209c within a virtual machine environment 208c and a second OS 205c outside of the VM environment 208c. The processing device 202c is configured to receive, by the server application 210c executing on the first OS 209c, a request 201c to perform a task 271c for a client application 207c executing on the second OS 205c. The processing device 202c is configured to detect, by the server application 210c based on the request 201c, an incompatibility 281c between the server application 210c and the client application 207c. The processing device 202c is configured to resolve the incompatibility 281c using a plurality of container images 211c.

Figure 3:
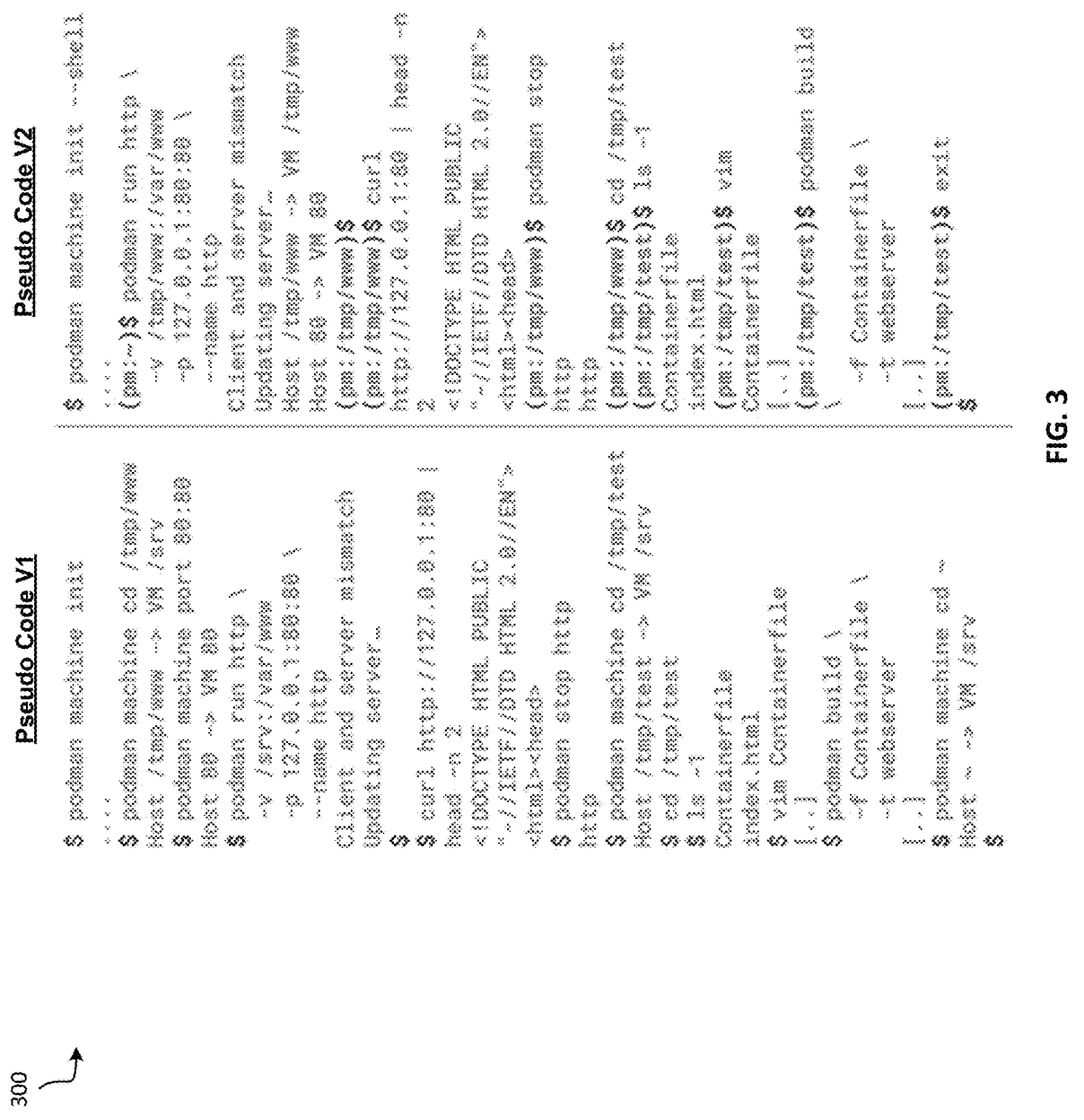

FIG. 3 is a block diagram depicting pseudo examples of how a user could interact with the server application using an input terminal, according to some embodiments. Pseudo code (V1) and Pseudo code (V2) are simply provided as examples.

FIG. 4 is a flow diagram depicting a method of customizing virtual machines for lightweight application deployment, according to some embodiments. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, one or more blocks of method 400 may be performed by one or more virtual machine management (VMM) systems, such as VMM system 104 in FIG. 1. In some embodiments, one or more blocks of method 400 may be performed by one or more server applications (e.g., server application 110) that execute within a virtual environment of a VM (e.g., VM 108 in FIG. 1). In some embodiments, one or more blocks of method 400 may be performed by one or more client applications (e.g., client application 107) that execute within a virtual environment of a VM (e.g., VM 108 in FIG. 1).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of executing a first operating system (OS) within a virtual machine (VM) environment and a second OS outside of the VM environment. The method 400 includes the block 404 of receiving, by a server application executing on the first OS, a request to perform a task for a client application executing on the second OS. The method 400 includes the block 406 of detecting, by the server application based on the request, an incompatibility between the server application and the client application. The method 400 includes the block 408 of resolving, by a processing device, the incompatibility using a plurality of container images 408.

Figure 5:
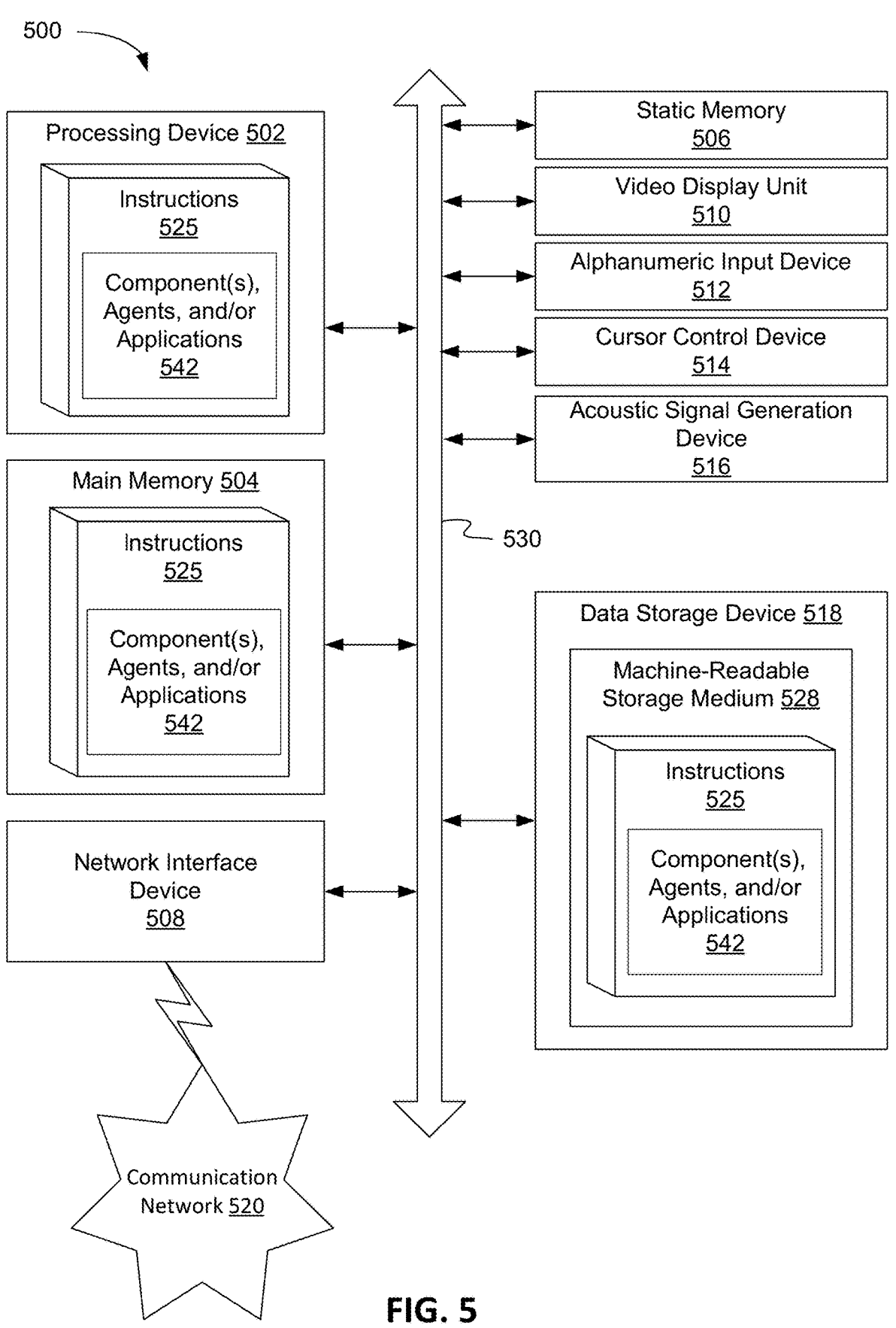
FIG. 5 is a block diagram of an example computing device 500 that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general-purpose processor, a PLD, etc.) 502, a main memory 504 (e.g., synchronous dynamic random-access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components/agents/applications 542 (e.g., hypervisor application 106, client application 107, OSTree native container 111, server application 110) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising executing, by a processing device, a first operating system (OS) within a virtual machine (VM) environment and a second OS outside of the VM environment; receiving, by a server application executing on the first OS, a request to perform a task for a client application executing on the second OS; detecting, by the server application based on the request, an incompatibility between the server application and the client application; and resolving the incompatibility using a plurality of container images.

Example 2 is the method of Example 1, wherein detecting, by the server application, the incompatibility between the server application and the client application based on the request includes at least one of: determining a version mismatch between the server application and the client application, determining a version mismatch between the server application and the VM environment, or determining a version mismatch between the server application and the first OS.

Example 3 is the method of any of Examples 1-2, wherein resolving the incompatibility using the plurality of container images, further includes: sending a first container image of the plurality of container images to a second container image of the plurality of container images to cause the second container image to update, using the first container image, at least one of the server application, the first OS, or the VM environment.

Example 4 is the method of any of Examples 1-3, wherein the second container image is an ostree native container image.

Example 5 is the method of any of Examples 1-4, wherein resolving the incompatibility using the plurality of container images is further without interruption to a performance of other container images executing within the VM environment.

Example 6 is the method of any of Examples 1-5, further including: identifying a first container image of the plurality of container images based on the incompatibility between the server application and the client application; and determining whether the first container image is available in a container registry.

Example 7 is the method of any of Examples 1-6, further including: determining that a first container image of the plurality of container images is not available in a container registry; determining one or more differences associated with the incompatibility between the server application and the client application responsive to determining that the first container image is not available in the container registry; and generating the first container image based on the one or more differences.

Example 8 is the method of any of Examples 1-7, wherein generating the first container image based on the one or more differences further includes: identifying, based on the one or more differences, one or more container image layers; acquiring the one or more container image layers from the container registry; and rebasing, using the one or more container image layers, a base layer associated with the server application to generate the first container image.

Example 9 is the method of any of Examples 1-8, further including: storing the first container image in the container registry to be used by used by a second server application.

Example 10 is the method of any of Examples 1-9, wherein the first OS is a Linux OS and the second OS is a different type of operating system than the first OS.

Example 11 is a system including: a memory; and a processing device that is operatively coupled to the memory, to execute a first operating system (OS) within a virtual machine (VM) environment and a second OS outside of the VM environment; receive, by a server application executing on the first OS, a request to perform a task for a client application executing on the second OS; detect, by the server application based on the request, an incompatibility between the server application and the client application; and resolve the incompatibility using a plurality of container images.

Example 12 is the system of Example 11, wherein to detect, by the server application, the incompatibility between the server application and the client application based on the request, the processing device is further to at least one of: determine a version mismatch between the server application and the client application, determine a version mismatch between the server application and the VM environment, or determine a version mismatch between the server application and the first OS.

Example 13 is the system of any of Examples 11-12, wherein to resolve the incompatibility using the plurality of container images, the processing device is further to: send a first container image of the plurality of container images to a second container image of the plurality of container images to cause the second container image to update, using the first container image, at least one of the server application, the first OS, or the VM environment.

Example 14 is the system of any of Examples 11-13, wherein the second container image is an ostree native container image.

Example 15 is the system of any of Examples 11-14, wherein to resolve the incompatibility using the plurality of container images is further without interruption to a performance of other container images executing within the VM environment.

Example 16 is the system of any of Examples 11-15, wherein the processing device is further to: identify a first container image of the plurality of container images based on the incompatibility between the server application and the client application; and determine whether the first container image is available in a container registry.

Example 17 is the system of any of Examples 11-16, wherein the processing device is further to: determine that a first container image of the plurality of container images is not available in a container registry; determine one or more differences associated with the incompatibility between the server application and the client application responsive to determining that the first container image is not available in the container registry; and generate the first container image based on the one or more differences.

Example 18 is the system of any of Examples 11-17, wherein to generate the first container image based on the one or more differences, the processing device is further to: identify, based on the one or more differences, one or more container image layers; acquire the one or more container image layers from the container registry; and rebase, using the one or more container image layers, a base layer associated with the server application to generate the first container image.

Example 19 is the system of any of Examples 11-18, wherein the processing device is further to: store the first container image in the container registry to be used by used by a second server application, wherein the first OS is a Linux OS and the second OS is a different type of operating system than the first OS.

Example 20 is a non-transitory computer-readable medium storing instructions that, when execute by a processing device, cause the processing device to: execute, by the processing device, a first operating system (OS) within a virtual machine (VM) environment and a second OS outside of the VM environment; receive, by a server application executing on the first OS, a request to perform a task for a client application executing on the second OS; detect, by the server application based on the request, an incompatibility between the server application and the client application; and resolve the incompatibility using a plurality of container images.

Example 21 is an apparatus including means for receiving, by a server application executing on a first OS of a virtual machine (VM), a request to perform a task for a client application executing on a second OS; means for detecting, by the server application based on the request, an incompatibility between the server application and the client application; and means for resolving, by a processing device, the incompatibility using a plurality of container images.

Example 22 is the apparatus of Example 21, further including means for at least one of determining a version mismatch between the server application and the client application, determining a version mismatch between the server application and the VM environment, or determining a version mismatch between the server application and the first OS.

Example 23 is the apparatus of any of Example 21-22, further including means for sending a first container image of the plurality of container images to a second container image of the plurality of container images to cause the second container image to update, using the first container image, at least one of the server application, the first OS, or the VM environment.

Example 24 is the apparatus of any of Example 21-23, wherein the second container image is an ostree native container image.

Example 25 is the apparatus of any of Example 21-24, wherein resolving the incompatibility using the plurality of container images is further without interruption to a performance of other container images executing within the VM environment.

Example 26 is the apparatus of any of Example 21-25, further including means for identifying a first container image of the plurality of container images based on the incompatibility between the server application and the client application; and means for determining whether the first container image is available in a container registry.

Example 27 is the apparatus of any of Example 21-26, further including means for determining that a first container image of the plurality of container images is not available in a container registry; means for determining one or more differences associated with the incompatibility between the server application and the client application responsive to determining that the first container image is not available in the container registry; and means for generating the first container image based on the one or more differences.

Example 28 is the apparatus of any of Example 21-27, further including means for identifying, based on the one or more differences, one or more container image layers; acquiring the one or more container image layers from the container registry; and means for rebasing, using the one or more container image layers, a base layer associated with the server application to generate the first container image.

Example 29 is the apparatus of any of Example 21-28, further including means storing the first container image in the container registry to be used by used by a second server application.

Example 30 is the apparatus of any of Example 21-29, wherein the first OS is a Linux OS and the second OS is a different type of operating system than the first OS.

Unless specifically stated otherwise, terms such as "executing," "receiving," "detecting," "resolving," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the embodiments of the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the embodiments of the present disclosure are not to be limited to the details given herein, but may be modified within the scope and equivalents of the appended claims.

What is claimed is:

1. A method comprising:
executing a first operating system (OS) within a virtual machine (VM) environment and a second OS outside of the VM environment;
receiving, by a server application executing on the first OS, a request to perform a task for a client application executing on the second OS;
detecting, by the server application based on the request, an incompatibility between the server application and the client application; and
resolving, by a processing device, the incompatibility using a plurality of container images by selecting an OSTree native container image identified in a container registry and invoking an operation within the VM to atomically apply the OSTree native container image to update the server application and the first OS, while preserving container storage such that other container images executing within the VM persist across the update.

2. The method of claim 1, wherein detecting, by the server application, the incompatibility between the server application and the client application based on the request comprises at least one of:
determining a version mismatch between the client application and the server application,
determining a version mismatch between the client application and the VM environment, or
determining a version mismatch between the client application and the first OS.

3. The method of claim 1, wherein resolving the incompatibility using the plurality of container images, further comprises:
retrieving the OSTree native container image from the container registry; and
sending a first container image of the plurality of container images to a second container image of the plurality of container images comprising the OSTree native container image, to cause the second container image to update, using the first container image, at least one of the server application, the first OS, or the VM environment.

4. The method of claim 1, wherein resolving the incompatibility using the plurality of container images is performed without causing an interruption to a performance of other container images executing within the VM environment.

5. The method of claim 1, further comprising:
identifying a first container image of the plurality of container images based on the incompatibility between the server application and the client application; and
determining whether the first container image is available in the container registry.

6. The method of claim 1, further comprising:

determining that a first container image of the plurality of container images is not available in the container registry;

determining one or more differences associated with the incompatibility between the server application and the client application responsive to determining that the first container image is not available in the container registry; and generating the first container image based on the one or more differences.

7. The method of claim 6, wherein generating the first container image based on the one or more differences further comprises:

identifying, based on the one or more differences, one or more container image layers;

acquiring the one or more container image layers from the container registry; and rebasing, using the one or more container image layers, a base layer associated with the server application to generate the first container image.

8. The method of claim 6, further comprising:

storing the first container image in the container registry to be used by used by a second server application.

9. The method of claim 1, wherein the first OS is a Linux OS and the second OS is a different type of operating system than the first OS.

10. A system comprising:

a memory; and a processing device that is operatively coupled to the memory, to:

execute a first operating system (OS) within a virtual machine (VM) environment and a second OS outside of the VM environment;

receive, by a server application executing on the first OS, a request to perform a task for a client application executing on the second OS;

detect, by the server application based on the request, an incompatibility between the server application and the client application; and resolve the incompatibility using a plurality of container images by selecting an OSTree native container image identified in a container registry and invoking an operation within the VM to atomically apply the OSTree native container image to update the server application and the first OS, while preserving container storage such that other container images executing within the VM persist across the update.

11. The system of claim 10, wherein to detect, by the server application, the incompatibility between the server application and the client application based on the request, the processing device is further to at least one of:

determine a version mismatch between the client application and the server application, determine a version mismatch between the client application and the VM environment, or determine a version mismatch between the client application and the first OS.

12. The system of claim 10, wherein to resolve the incompatibility using the plurality of container images, the processing device is further to:

retrieve the OSTree native container image from the container registry; and send a first container image of the plurality of container images to a second container image of the plurality of container images to cause the second container image to update, using the first container image, at least one of the server application, the first OS, or the VM environment.

13. The system of claim 10, wherein to resolve the incompatibility using the plurality of container images is performed without causing an interruption to a performance of other container images executing within the VM environment.

14. The system of claim 10, wherein the processing device is further to:

identify a first container image of the plurality of container images based on the incompatibility between the server application and the client application; and determine whether the first container image is available in the container registry.

15. The system of claim 10, wherein the processing device is further to:

determine that a first container image of the plurality of container images is not available in the container registry;

determine one or more differences associated with the incompatibility between the server application and the client application responsive to determining that the first container image is not available in the container registry; and generate the first container image based on the one or more differences.

16. The system of claim 15, wherein to generate the first container image based on the one or more differences, the processing device is further to:

identify, based on the one or more differences, one or more container image layers;

acquire the one or more container image layers from the container registry; and rebase, using the one or more container image layers, a base layer associated with the server application to generate the first container image.

17. The system of claim 15, wherein the processing device is further to:

store the first container image in the container registry to be used by used by a second server application, wherein the first OS is a Linux OS and the second OS is a different type of operating system than the first OS.

18. A non-transitory computer-readable medium storing instructions that, when execute by a processing device, cause the processing device to:

execute a first operating system (OS) within a virtual machine (VM) environment and a second OS outside of the VM environment;

receive, by a server application executing on the first OS, a request to perform a task for a client application executing on the second OS;

detect, by the server application based on the request, an incompatibility between the server application and the client application; and resolve, by the processing device, the incompatibility using a plurality of container images by selecting an OSTree native container image identified in a container registry and invoking an operation within the VM to atomically apply the OSTree native container image to update the server application and the first OS, while preserving container storage such that other container images executing within the VM persist across the update.

* * * * *